US009953073B2

(12) United States Patent
Hein et al.

(10) Patent No.: US 9,953,073 B2
(45) Date of Patent: Apr. 24, 2018

(54) SYSTEM AND METHOD FOR EDITING DYNAMICALLY AGGREGATED DATA

(71) Applicant: YAHOO HOLDINGS, INC., Sunnyvale, CA (US)

(72) Inventors: Brian Hein, Pacifica, CA (US); Peter Monaco, Los Altos, CA (US); Richard Sarvate, San Francisco, CA (US); Nitish Dalal, Mountain View, CA (US)

(73) Assignee: OATH INC., New York, NY (US)

( * ) Notice: Subject to any disclaimer, the term of this patent is extended or adjusted under 35 U.S.C. 154(b) by 374 days.

(21) Appl. No.: 14/715,012

(22) Filed: May 18, 2015

(65) Prior Publication Data

US 2016/0342669 A1 Nov. 24, 2016

(51) Int. Cl.

| | |
|---|---|
| ***G06F 17/30*** | (2006.01) |
| ***G06F 17/24*** | (2006.01) |
| ***G06Q 10/10*** | (2012.01) |

(52) U.S. Cl.

CPC ........ *G06F 17/30575* (2013.01); *G06F 17/24* (2013.01); *G06F 17/30011* (2013.01); *G06Q 10/109* (2013.01)

(58) Field of Classification Search

CPC combination set(s) only.
See application file for complete search history.

(56) References Cited

U.S. PATENT DOCUMENTS

| | | | | |
|---|---|---|---|---|
| 8,745,144 B2 * | 6/2014 | Souza | ................. | H04L 12/6418 370/232 |
| 2011/0307455 A1 * | 12/2011 | Gupta | .................. | G06Q 10/107 707/692 |

* cited by examiner

*Primary Examiner* — Shyue Jiunn Hwa
(74) *Attorney, Agent, or Firm* — James J. DeCarlo; Greenberg Traurig, LLP

(57) ABSTRACT

Disclosed are systems and methods for editing aggregated data based on edit requests that are received. An electronic edit file is automatically updated to include a newly-received edit. The edit file includes anchor points that each point to one of a plurality of aggregate data objects. The anchor points are used to determine one of the objects to which the edit file corresponds. The edit file is then applied to update data in this object including making the new edit.

14 Claims, 10 Drawing Sheets

400
402
Aggregate data into contacts using input data
404
Store aggregate contacts
406
Receive user edits to contacts
408
Create edit documents
410
Resolve each edit document to a corresponding aggregate contact
412
Apply edits from each edit document to its corresponding aggregate contact
414
Store updated aggregate contacts Local Network
524
Host
526
Network Service Provider
530
Internet
532
Server(s)
534
Network Link 528
500
Processing Unit(s)
512
Network Interface
514
Keyboard Interface
516
Pointing Device Interface
518
CD/ DVD Drive Interface
520
Misc. Other. Interface(s)
622
Computer Bus(es)
502
Memory
504
Storage Medium/ Media
506
Media Disk Interface
508
Display Interface
510

708
System Resources
Aggregate Contact
704
Walter
Email Address
Endpoint 1
Phone Number
Endpoint 2
Social Network Name
Endpoint 3
Social Friends
Endpoint 4
Prior Purchases
Endpoint 5
Contact Rank
Endpoint Scores
710
User Contact Edit
Network Resources
702
Mobile Device
API
Voice Mail Transcription Service
706
Mobile Device of Friend
User Application

SYSTEM AND METHOD FOR EDITING DYNAMICALLY AGGREGATED DATA

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to editing of data that has been aggregated (e.g., dynamically aggregated data obtained from various computer and/or network resources).

RELATED ART

Android's default contacts application (e.g., as distributed on Android phones) and iOS's contacts application each perform rudimentary aggregation of contacts for a user from different sources (e.g., local contacts, Facebook contacts, Yahoo! contacts, etc.). When the user views a contact in this context (e.g., views on a display of a mobile device), she is actually looking at an aggregate contact. However, when she edits the aggregate contact in a user interface of her mobile device, she is presented with all of the source contacts (e.g., the raw contacts that were aggregated) and must edit those individual contacts one at a time rather than editing the aggregate contact.

SUMMARY

The present disclosure describes computer systems and methods for editing aggregated data based on edit requests that are received from a computing device or a user (e.g., a user edit made in a user interface to update a contact for a friend). Some embodiments of the present disclosure are summarized below.

It is recognized in the disclosure herein that managing of multiple contacts across disparate sources and applications creates a problem for users of such systems and services, since maintaining reliable or "best" contact information is difficult or impossible without significant effort. Embodiments herein improve the performance of communication and messaging software, systems and servers by providing automated functionality that effectively and more efficiently manages contact data for a user in ways that cannot effectively be done manually.

In accordance with one or more embodiments, a method is disclosed which includes receiving, by a computing device, a new edit (e.g., a change to a phone number for a contact of a friend); updating an edit file to include the new edit, the edit file comprising a plurality of anchor points (e.g., a set of links to various contacts in a contacts database), each anchor point pointing to one of a plurality of aggregate objects including a first aggregate object (e.g., stored data that represents the contact of the friend); determining, by the computing device, based on the plurality of anchor points, that the edit file corresponds to the first aggregate object; and applying the edit file to update the first aggregate object based on the new edit (e.g., changing the data records corresponding to the contact so that the phone number is changed).

In accordance with one or more embodiments, another method includes creating, by a computing device, a plurality of aggregate contacts using input data collected by a network, the aggregate contacts including a first aggregate contact; storing the aggregate contacts in a data repository; receiving a new user edit; updating an edit document to include the new user edit, the edit document comprising a plurality of anchor points, each anchor point pointing to one of the plurality of aggregate contacts; determining, by the computing device, based on the plurality of anchor points, that the edit document corresponds to the first aggregate contact; applying the edit document to update the first aggregate contact, the applying comprising updating contact data of the first aggregate contact using the new user edit; and storing the updated first aggregate contact in the data repository.

In accordance with one or more embodiments, a non-transitory computer-readable storage medium is provided, the computer-readable storage medium tangibly storing thereon, or having tangibly encoded thereon, computer readable instructions that when executed cause at least one processor to perform one or more of the above methods.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
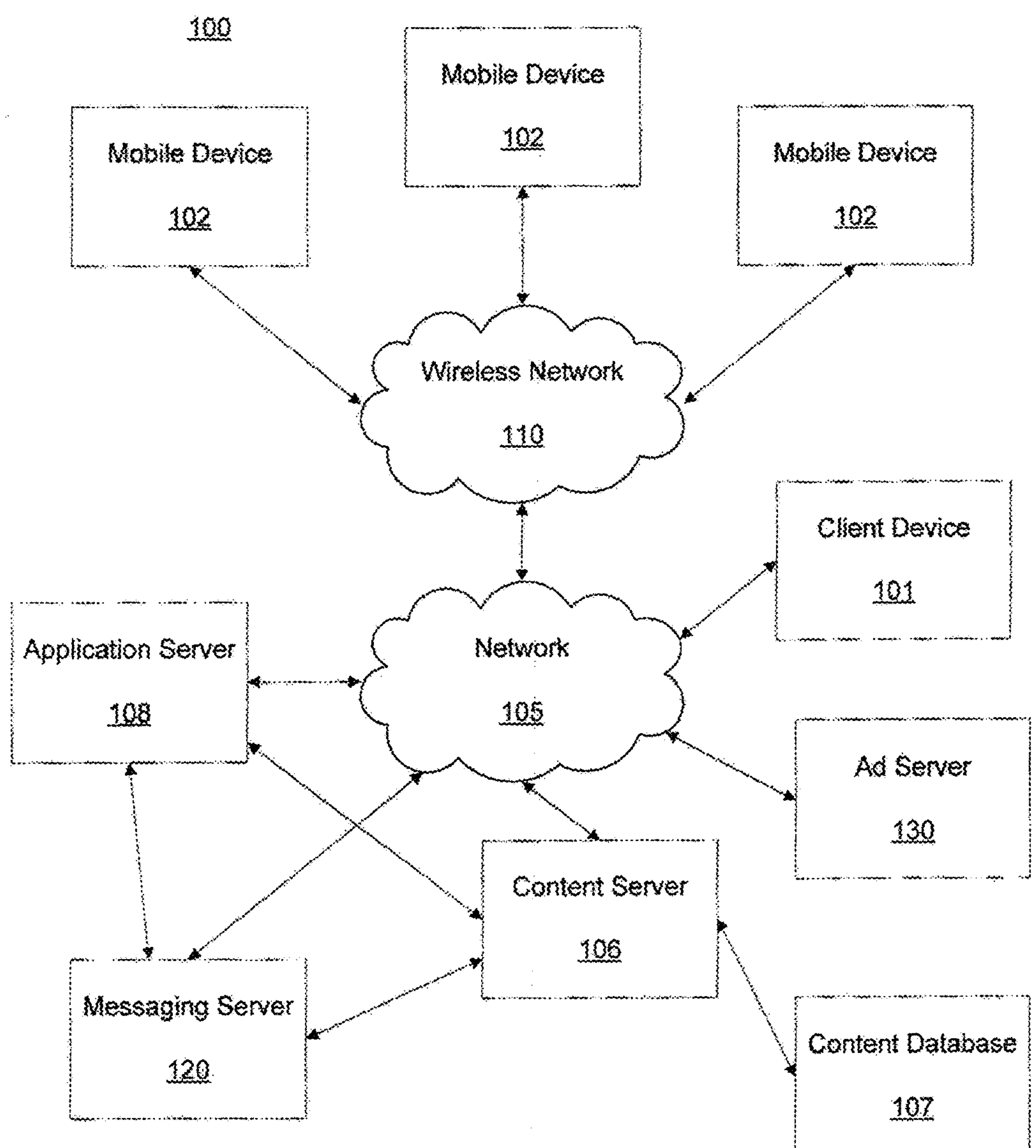
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a liquid crystal display (LCD), LED or OLED display for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via an email application such as Yahoo!® Mail, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices 102 and client device 101. FIG. 1 additionally includes a variety of servers, such as content server 106, application (or "App") server 108, messaging server 120 and advertising ("ad") server 130.

One embodiment of mobile devices 102 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, integrated devices combining one or more of the preceding devices, and the like. As such, mobile devices 102 typically range widely in terms of capabilities and features. For example, a cell phone may have a numeric keypad and an LCD display on which only text may be displayed. In another example, a web-enabled mobile device may have a touch sensitive screen, a stylus, and a color LCD or LED display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client device 101 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized with an electronic social networking site (e.g., an aggregate object may include social network data collected for a person from a social networking site using an API of the site). An electronic social network refers generally to a network of individuals, such as acquaintances, friends, family, colleagues, or co-workers, coupled via a communications network or via a variety of sub-networks.

Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device (e.g., the content may be an aggregated object edited by one of the embodiments disclosed below prior to delivery, such as edits made by a producer of the content, or edits requested by a consumer or customer to receive the content). A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, instant messaging (IM) services, SMS services, MMS services, FTP services, voice over IP (VOIP) services, or the like (e.g., these services may use or be based on aggregate objects as described below). Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users (e.g., the advertisements may be aggregated data that is dynamically edited as described herein). "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-102. In some embodiments, applications, such as a messaging application (e.g., Yahoo! Messenger®, Yahoo! Mail®, and the like), can be hosted by the application server 108. Thus, the application server 108 can store various types of applications and application related information including application data and user profile information.

In one example, the application server 108 can receive user edits requested by users to update contacts that are stored or maintained by the server. These contacts may be aggregate contacts as described below.

In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
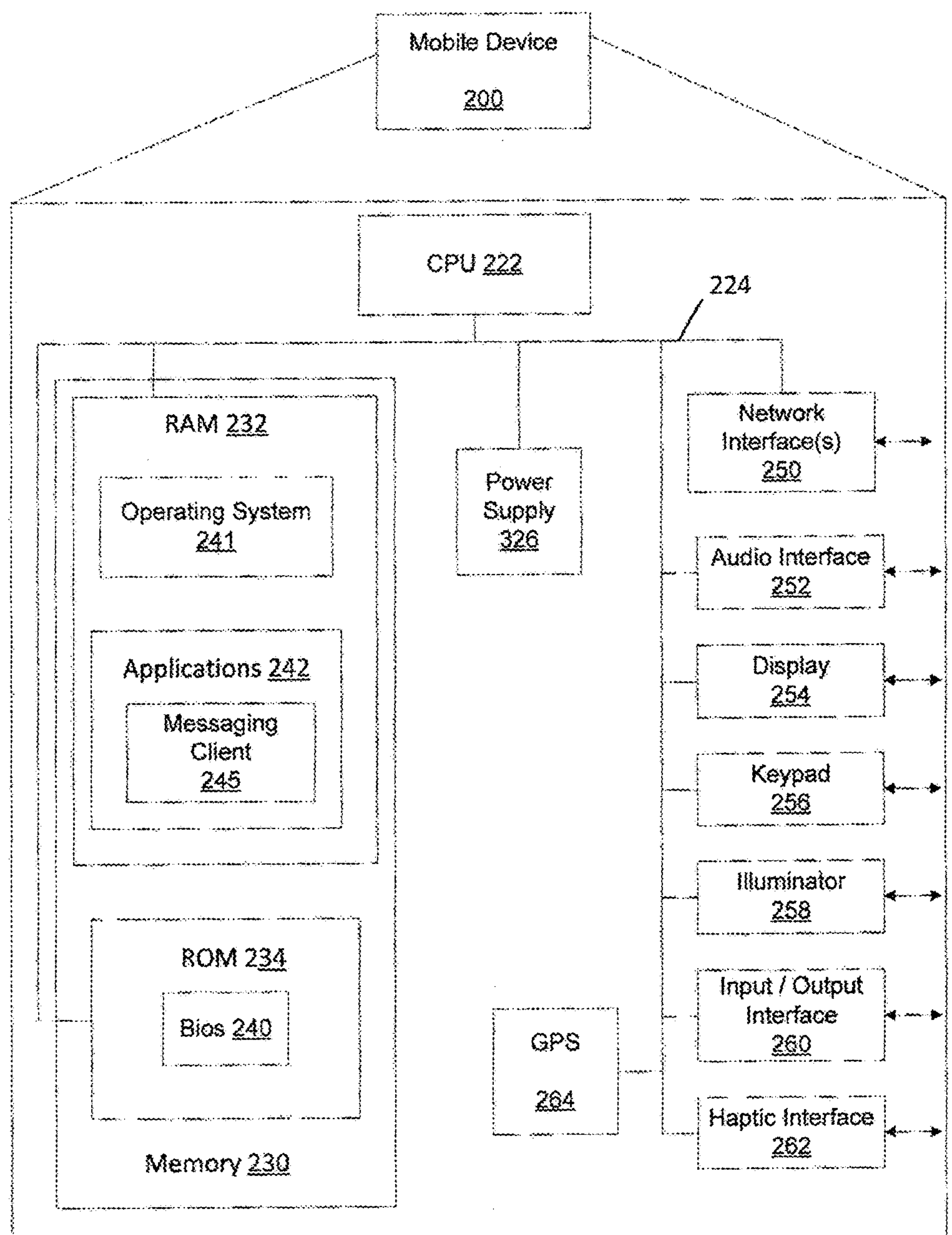
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), Long Term Evolution (LTE), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), OLED, or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device (e.g., applications 242 may include a contact manager that provides a user interface to a user for editing contacts that are displayed to the user; data for display to the user is derived from aggregate contacts as discussed herein).

Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using email, SMS, MMS, IM, VOIP, and/or any of a variety of other messaging communication protocols. Although a single messaging client 245 is illustrated it should be clear that multiple messaging clients may be employed. For example, one messaging client may be configured to manage email messages, where another messaging client manages SMS messages, and yet another messaging client is configured to manage serving advertisements, Ns, or the like.

Having described the components of the general architecture employed within the disclosed systems and methods, the components' general operation with respect to the disclosed systems and methods will now be described.

Figure 3:
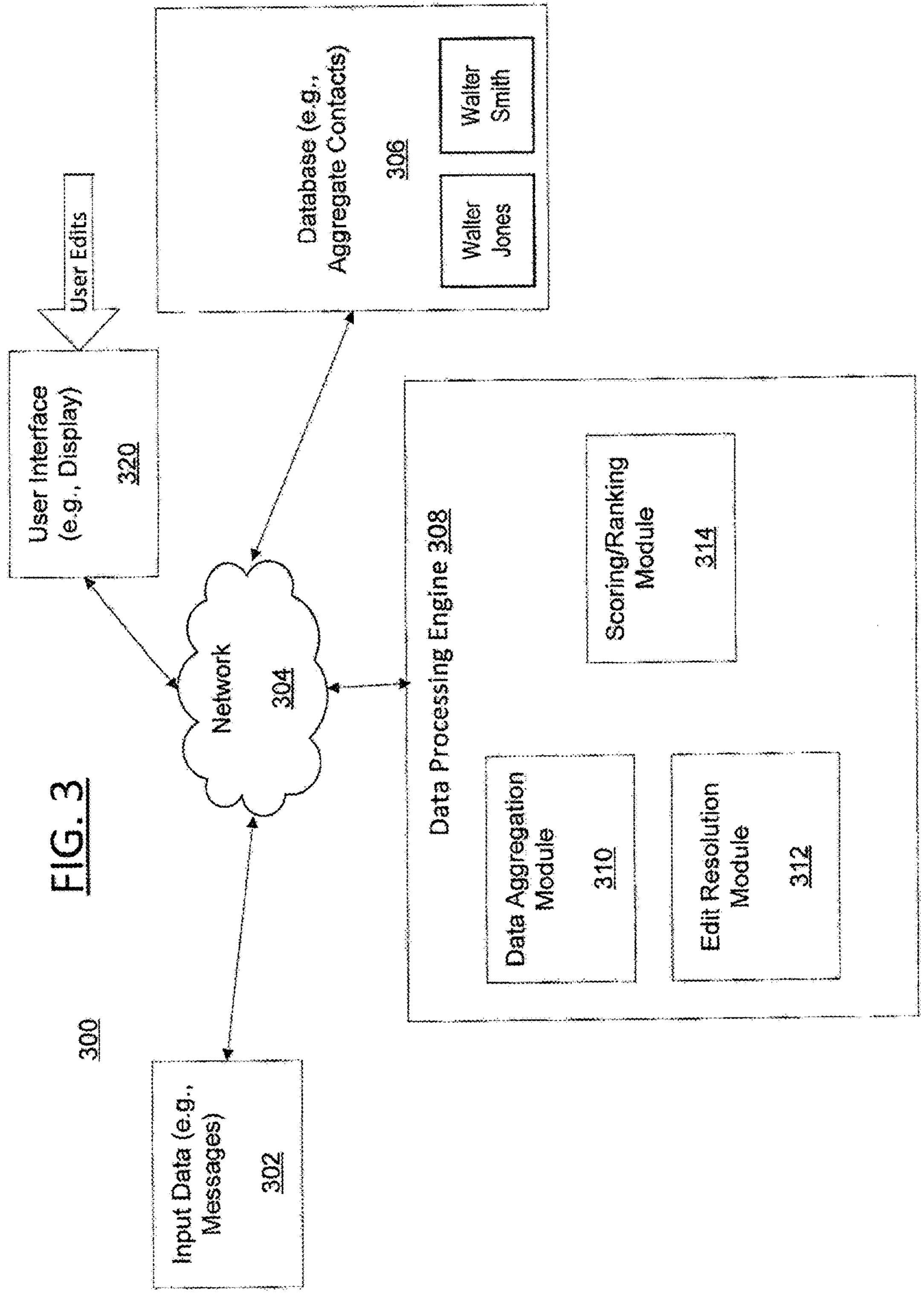
FIG. 3 is a schematic block diagram illustrating components of a system in accordance with embodiments of the present disclosure.

FIG. 3 is a block diagram illustrating the components of system 300 for performing the systems and methods discussed herein according to some embodiments. A data repository 306 stores a plurality of aggregate contacts (e.g., a database that contains aggregate contacts for each of exemplary persons Walter Jones and Walter Smith). Data processing engine 308 includes a processor (not shown) to execute data aggregation module 310, edit resolution module 312, and scoring/ranking module 314. As described in more detail below, the processor of data processing engine 308 executes various program logic including: creation logic executed by the processor for creating the plurality of aggregate contacts; communication logic executed by the processor for receiving, over a network, a new user edit; updating logic executed by the processor for updating an edit document to include the new user edit, the edit document comprising a plurality of anchor points, each anchor point pointing to one of the plurality of aggregate contacts; resolution logic executed by the processor for determining, based on the plurality of anchor points, that the edit document corresponds to the first aggregate contact; and editing logic executed by the processor for applying the edit document to the first aggregate contact.

FIG. 3 further includes a plurality of input data 302 (e.g., messages sent to and from a user), a network 304, a user interface 320 (e.g., a display of a mobile device for a user to input edits to her contacts, which contacts are stored in data repository 306). The data processing engine 308 could be hosted by a web server, content provider, email service provider, ad server, a user's computing device, an application server, or any combination thereof.

As described in more detail below, aggregate contacts are created or updated by collecting input data from numerous sources. One of these sources may be messages sent to or from a user by various persons, including messages to friends or contacts of a user of a mobile device.

The messages in input data 302 can be any type of message. Examples of such messages can include email messages, HTML forms SMS/MMS messages, Skype® messages, Twitter® messages and other social messages, comments to an article or website, online forum posts/entries, word processing documents, help desk messages, portable document format (PDF) documents and/or other types of documents. The messages or other input data can be provided to the data processing engine 308 or accessed by a computer program or device that can access the input data. In some embodiments, the input data 302 can be stored in a database in data repository 306, which may be associated with an email provider, such as Yahoo! Mail®. The database can be any type of database or memory that can store the messages and other input data 302.

For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be communicated and/or accessed and processed by the data processing engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the input data sources 302, the data processing engine 308, and the data repository 306.

The principal processor, server, or combination of devices that comprises hardware programmed in accordance with the special purpose functions herein, referred to for convenience as data processing engine 308, includes data aggregation module 310, edit resolution module 312, and scoring/ranking module 314, as mentioned above. It should be understood that the engine(s) and modules discussed herein are non-exhaustive, as additional or fewer engines and/or modules may be applicable to the embodiments of the systems and methods discussed. The operations, configurations and functionalities of each module, and their role within various embodiments of the present disclosure are discussed with reference to FIG. 4.

Figure 4:
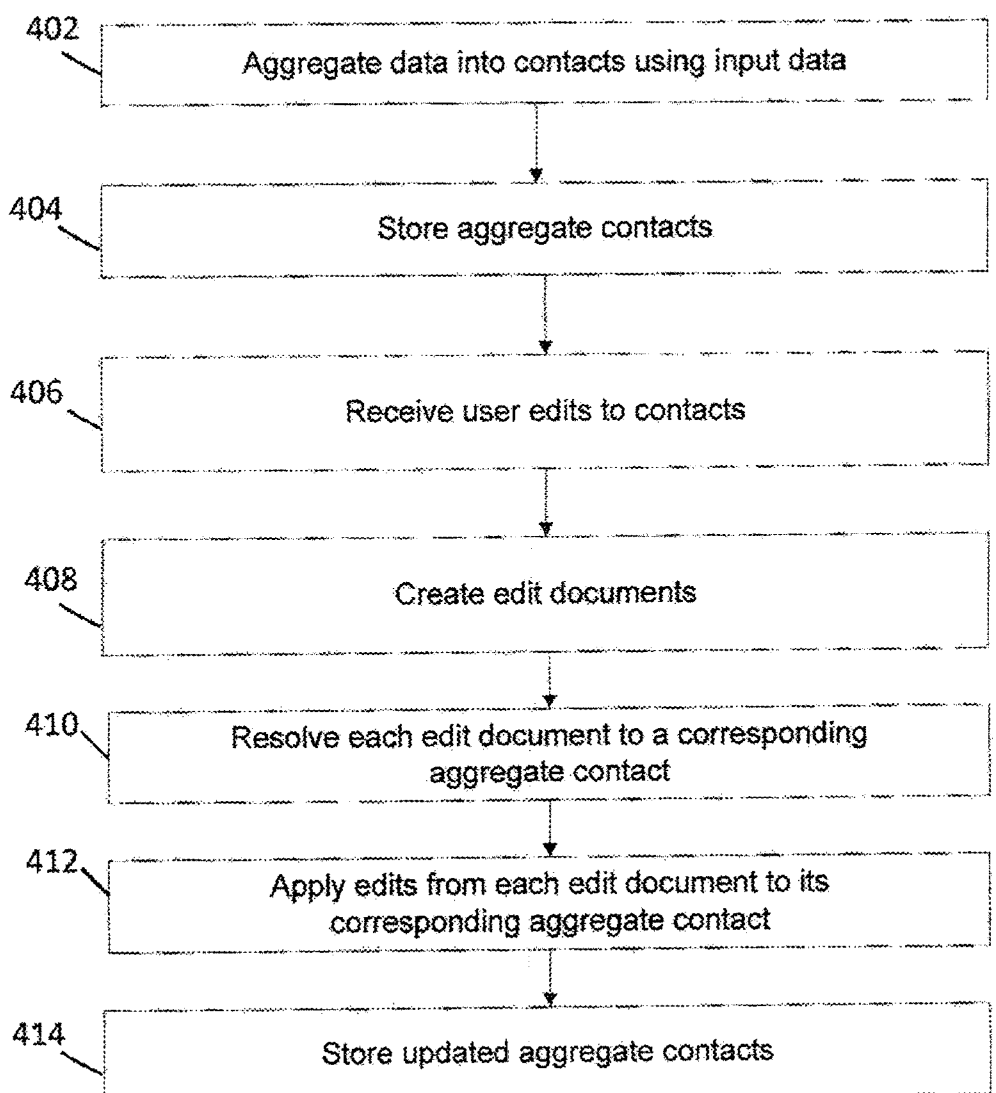
FIG. 4 is a flowchart illustrating steps performed in accordance with some embodiments of the present disclosure.

FIG. 4 is a process 400 diagram illustrating steps performed in accordance with embodiments of the present disclosure for editing an aggregate contact. Process 400 is performed by the data processing engine 308.

Process 400 begins with Step 402 where aggregate contacts are created. This step is performed by the data aggregation module 310 of the data processing engine 308. Step 402 creates the aggregate contacts using input data collected over one or more networks, such as network 105 or 304. These aggregate contacts include a first aggregate contact for a person such as, for example, “Walter Jones”.

Step 404 stores the aggregate contacts in data repository 306. The contacts may be accessible for use by a user of a mobile device. The user, for example, may view the contacts in a contact manager running on the mobile device. In some examples, the contacts may be downloaded from a server to the user’s mobile device.

In Step 406, a new user edit to information for one of the aggregate contacts is received from the user. For example, the user may provide edits to the contacts such as changing phone numbers or e-mail address information.

In Step 408, an edit document is created to include the new user edit. The edit document is created when the user first provides an edit to a contact for a person (edit documents are discussed in more detail below). The edit document corresponds to this contact and will include this first edit and all subsequent edits made by the user to the contact. Thus, the edit document acts as a log of changes made to the contact.

In order to operate as a stateless contact system, the contacts are periodically or regularly re-created from the input data. For example, contacts may be re-created once each day. After an aggregate contact is re-created, all edits in the edit document are applied to update the aggregate contact so that the contact data in the aggregate contact corresponds to all edits previously provided by the user for that contact.

In some embodiments, the edit document includes a plurality of anchor points, each anchor point pointing to one of the aggregate contacts stored in data repository 306. An anchor point is used to define a relationship between an edit and a contact, as is discussed in more detail below. In typical operation, the user makes edits to numerous contacts. These edits are stored in an edit document corresponding to the contact being edited by the user. Each edit document contains anchor points that point to various aggregate contacts, as discussed in more detail below.

It should also be noted that, in some embodiments, each anchor point has an associated weight. This weight indicates the strength of the relationship to an aggregate contact for that particular anchor point. As discussed below, each weight may be based on a rank or a score associated with the aggregate contact (e.g., various pieces of data contained in an aggregate contact may be referred to as “endpoints” and each endpoint have a score, as is discussed in more detail below). These ranks and scores are dynamically and automatically determined by scoring/ranking module 314 during the operation of data processing engine 308 (e.g., as messages are received by the user, as a network service is provided to the user, as the user or friends of the user interact with a social network, etc.).

For example, a rank of a given aggregate contact may be based on data corresponding to communication interactions between the user and the person corresponding to that aggregate contact. In one example, these interactions include a history of message communications such as emails and/or instant messages sent to and from the person. Various known or to-become-known approaches for ranking of a contact (or a person corresponding to the contact), or scoring of endpoints within a contact or other data object, may be used to implement the functions described in further detail herein.

In many embodiments, the ranks and scores are determined and updated more frequently than the edits are made to the aggregate contacts using the edit documents. In order to reflect the intent of the user when making an edit, the weights of the anchor points at the time of such edit are used during resolution of the edit documents to the corresponding aggregate contacts. This is done even though these weights as determined by the dynamically-changing ranks and scores may be different at the time of the edit document resolution process.

In Step 410, each of these edit documents is resolved to determine a corresponding aggregate contact into which the edits of the edit document will be made. This step is performed by edit resolution module 312 of data processing engine 308. This step involves determining, based on the plurality of anchor points, that a particular one of the edit documents corresponds to the first aggregate contact. This step will also determine that the other edit documents correspond to other of the aggregate contacts.

In Step 412, the edits in the first edit document are applied to make changes to the first aggregate contact. The change will include updating the contact data to correspond to the most recent edits provided by the user for the person corresponding to the aggregate contact.

In Step 414, the aggregate contacts that have been updated by applying the edits listed in their corresponding edit documents are stored as updated aggregate contacts in data repository 306. This step may also be performed by data aggregation module 310.

In one embodiment, the edit document further comprises a plurality of prior user edits applied to the first aggregate contact (e.g., at an earlier day) prior to receiving the new user edit. A rank may be determined for each of the plurality of aggregate contacts, wherein the plurality of anchor points comprises a first anchor point that points to the first aggregate contact, the first aggregate contact has a first rank, and the weight of the first anchor point is based on the first rank.

In one embodiment, the first aggregate contact is associated with a first person, and the rank of the first aggregate contact is based on prior messages sent to the first person by the user. In one embodiment, each anchor point comprises a weight, the weight determined prior to receiving the new user edit (e.g., the weight as exists at the time of receiving the user edit will be used in the edit document when determining the corresponding aggregate contact).

In one embodiment, each anchor point comprises a weight, and the determining of an aggregate contact to edit based on the plurality of anchor points comprises comparing a sum of weights for anchor points in the edit document that point to the first aggregate contact to a sum of weights for all anchor points in the edit document, as discussed further below. As a specific example, using FIG. 10, which figure itself is discussed in more detail below, the weights for the email address and work phone number anchor points that point to Contact 1 sum to a total of 9+1=10. This sum is compared to all weights for all anchor points in the edit document, which is a total of 9+1+4=14. Thus, the sum of weights for Contact 1 is 71.4% of the total of all weights. Because 71.4% is greater than or equal to a predetermined threshold percentage of, for example, 50% of the sum of all anchor point weights in the edit document, then this Contact 1 is selected. If the sum of the weights for the anchor points pointing to Contact 1 were less than this predetermined percentage, then the edit document is discarded as being unresolvable.

In one embodiment, each anchor point comprises a weight, and the determining that the edit document corresponds to the first aggregate contact is based on the weights of the anchor points at the time of receiving the new user edit. As also discussed below, the anchor point weights are only updated when the edit document is modified, at which time the contact to which the edit document currently belongs is used to fully recalculate all the anchor point weights.

Figure 5:
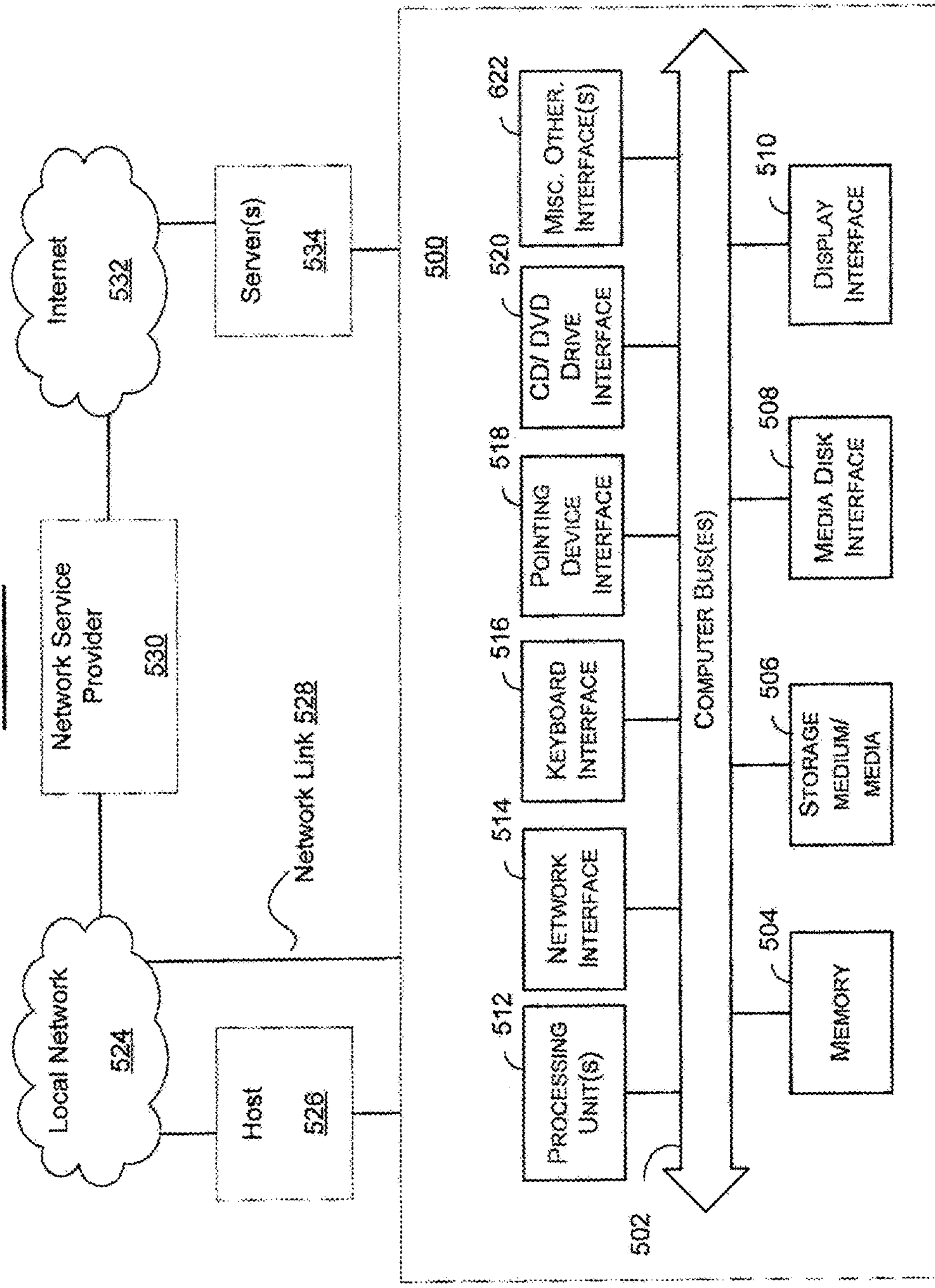
FIG. 5 is a block diagram illustrating an architecture of a hardware device in accordance with one or more embodiments of the present disclosure.

As shown in FIG. 5, internal architecture 500 includes one or more processing units, processors, or processing cores, (also referred to herein as CPUs) 512, which interface with at least one computer bus 502. Also interfacing with computer bus 502 are computer-readable medium, or media, 505, network interface 514, memory 504, e.g., random access memory (RAM), run-time transient memory, read only memory (ROM), media disk drive interface 520 as an interface for a drive that can read and/or write to media including removable media such as floppy, CD-ROM, DVD, media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces and a universal serial bus (USB) interface.

Memory 504 interfaces with computer bus 502 so as to provide information stored in memory 504 to CPU 512 during execution of software programs such as an operating system, application programs, device drivers, and software modules that comprise program code, and/or computer executable process steps, incorporating functionality described herein, e.g., one or more of process flows described herein. CPU 512 first loads computer executable process steps from storage, e.g., memory 504, computer readable storage medium/media 506, removable media drive, and/or other storage device. CPU 512 can then execute the stored process steps in order to execute the loaded computer-executable process steps. Stored data (e.g., data stored by a storage device) can be accessed by CPU 512 during the execution of computer-executable process steps.

Persistent storage, e.g., medium/media 506, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 528 typically provides information communication using transmission media through one or more networks to other devices that use or process the information. For example, network link 528 may provide a connection through local network 524 to a host computer 526 or to equipment operated by a Network or Internet Service Provider (ISP) 530. ISP equipment in turn provides data communication services through the public, worldwide packet-switching communication network of networks now commonly referred to as the Internet 532.

A computer called a server host 534 connected to the Internet 532 hosts a process that provides a service in response to information received over the Internet 532. For example, server host 534 hosts a process that provides information representing video data for presentation at display 510. It is contemplated that the components of system 500 can be deployed in various configurations within other computer systems, e.g., host and server.

At least some embodiments of the present disclosure are related to the use of computer system 500 for implementing some or all of the techniques described herein. According to one embodiment, those techniques are performed by computer system 500 in response to processing unit 512 executing one or more sequences of one or more processor instructions contained in memory 504. Such instructions, also called computer instructions, software and program code, may be read into memory 504 from another computer-readable medium 506 such as storage device or network link. Execution of the sequences of instructions contained in memory 504 causes processing unit 512 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 500. Computer system 500 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 502 as it is received, or may be stored in memory 504 or in storage device or other non-volatile storage for later execution, or both.

Figure 6:
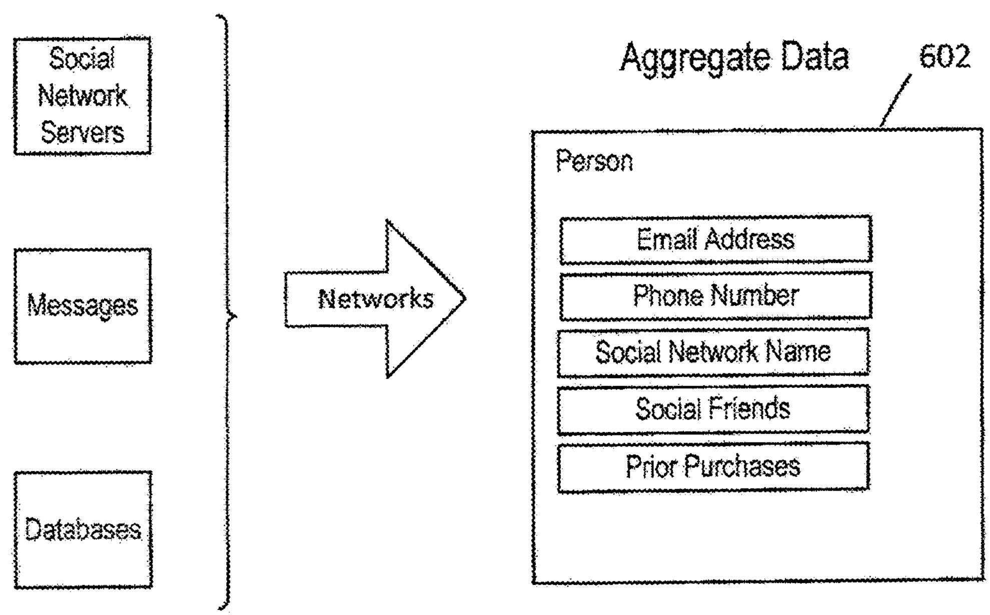
FIG. 6 illustrates an aggregate object assembled using input data collected over one or more networks in accordance with one or more embodiments of the present disclosure.

FIG. 6 illustrates an aggregate object 602 assembled using input data collected over one or more networks in accordance with one or more embodiments of the present disclosure. Aggregate object 602 may be, for example, an aggregate contact as was discussed above. However, in other embodiments, aggregate object 602 may correspond to other forms of aggregated data.

In the example of a contact for a person, the aggregate data may include items or pieces of data such as an e-mail address, a phone number, a social network name, social friends, and prior purchase transaction information. Numerous and various varieties of input data may be used such as, for example, data sourced from social network servers, messages from messaging server 120, messages stored in a database of data repository 306, etc. The input data may be collected both from a local computing device and from remote computing devices. In one example, the input data is obtained from a mobile device of a user.

Figure 7:
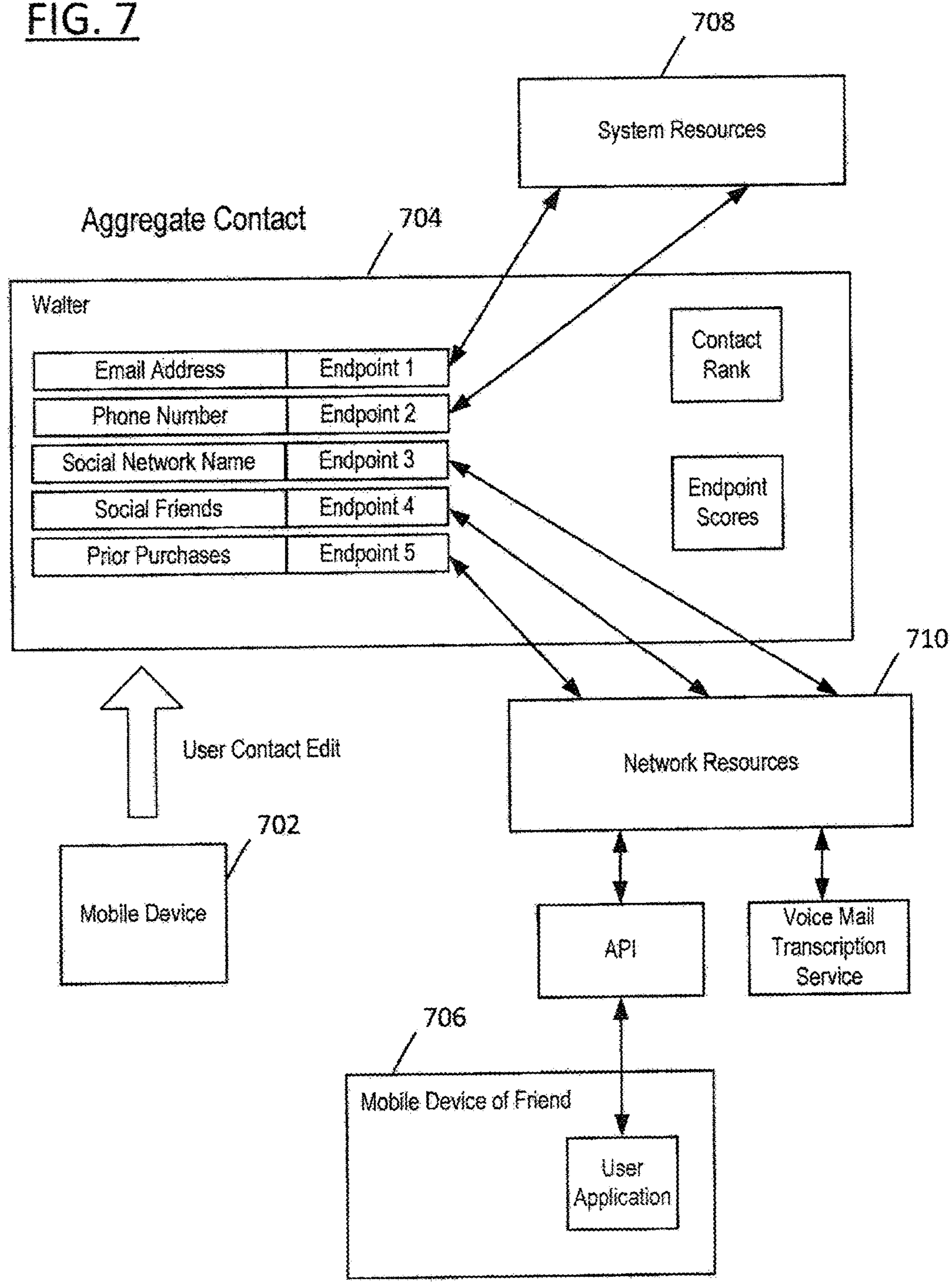
FIG. 7 illustrates an aggregate contact comprising several endpoints associated with or accessible by various system and network resources in accordance with one or more embodiments of the present disclosure.

FIG. 7 illustrates an aggregate contact 704 comprising several endpoints (i.e., Endpoint 1, Endpoint 2, etc.) associated with or accessible by system resources 708 and/or network resources 710, in accordance with one or more embodiments of the present disclosure. Each endpoint is a type of data that is predefined as part of the system functionality. Examples of types of endpoints are an e-mail address type and a phone number type. Endpoint 1 is for example data for the e-mail address for the person "Walter" for which the aggregate contact 704 contains contact data.

As was discussed above, the user may make an edit to the contact data corresponding to aggregate contact 704 on the user's mobile device 702. For example, the user may edit the e-mail address stored in aggregate contact 704 as Endpoint 1. This edit will be included in an edit document as was discussed above. During application of the edit document to aggregate contact 704, Endpoint 1 will be updated to reflect the new edit.

The endpoints of aggregate contact 704 are regularly accessed by system resources 708, which may use, for example, an e-mail address or phone number in providing services by a server. Network resources 710 may use various of the endpoints in providing services to other computing devices over a network. For example, these endpoints may be used by a voicemail transcription service that transcribes a voicemail for "Walter" using the endpoints. As another example, a mobile device 706, which is operated by a friend that is granted access to aggregate contact 704 by the user, contains a user application that accesses the endpoints via an application programming interface (API).

As was discussed above, each aggregate contact 704 may have a contact rank that is stored in the contact data. Also, in some embodiments, at least one of, some, or all of the endpoints may each be associated with a score. These endpoint scores are also stored in the contact data of aggregate contact 704. This rank and the scores are used as described below to determine weights for the anchor points in the edit documents.

Figure 8:
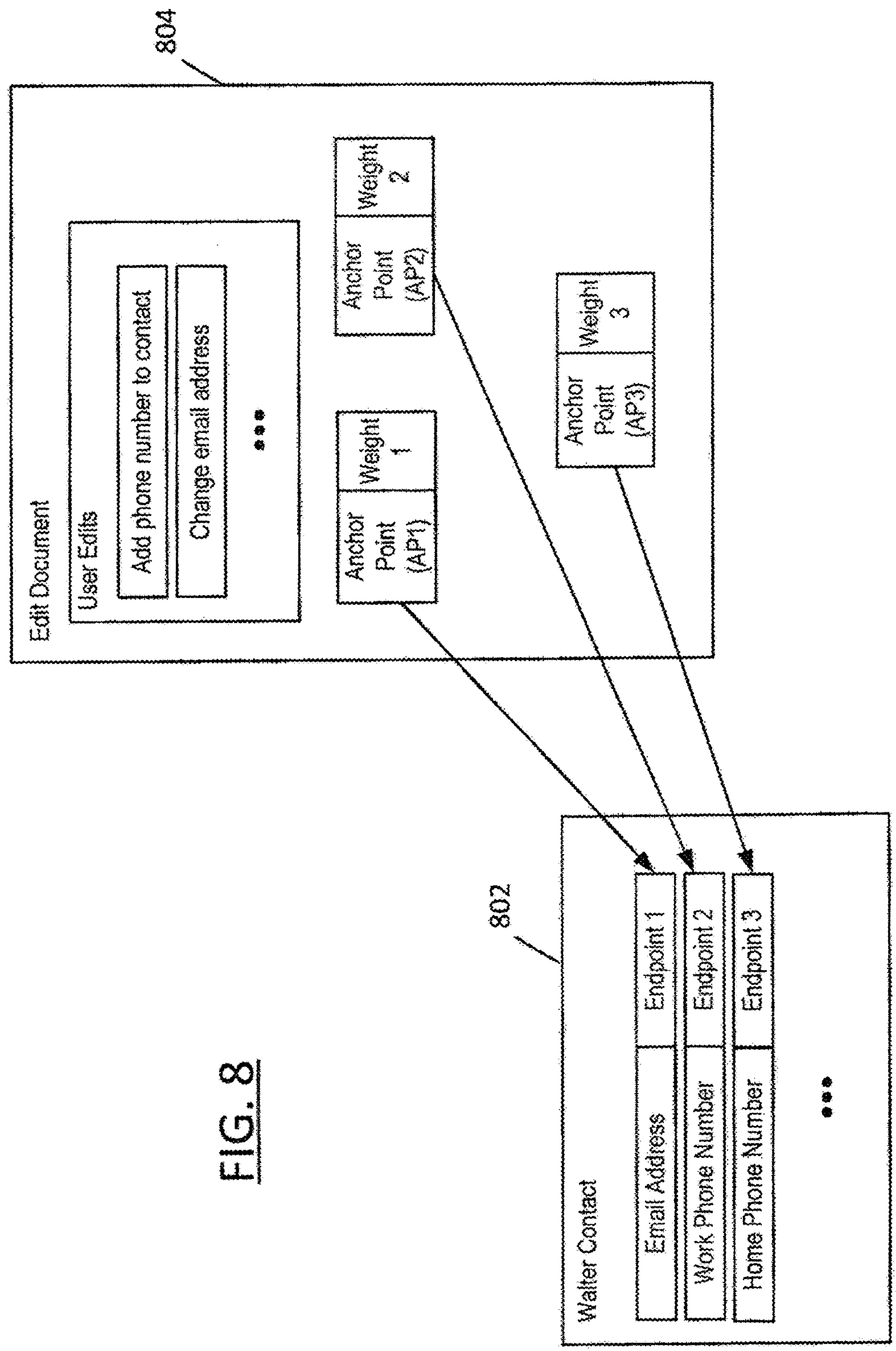
FIG. 8 illustrates an edit document containing anchor points that point to various endpoints of an aggregate contact in accordance with one or more embodiments of the present disclosure.

FIG. 8 illustrates an edit document 804 containing anchor points (AP1, AP2, etc.) that point to various endpoints of an aggregate contact 802 in accordance with one or more embodiments of the present disclosure. Each anchor point has a weight (Weight 1, Weight 2, etc.). Each anchor point is linked to (or points to) an endpoint in aggregate contact 802. The strength of the relationship to aggregate contact 802 is indicated by the weight of the anchor point.

Edit document 804 contains various user edits, such as add a phone number or change an email address. The user edits include a new user edit received from a user via a user interface displayed to the user on her personal computing device. In other embodiments, the edits may be automatically provided by a computing system without the need for manual user entry. For example, these edits may be corrections to data to be made to contacts as determined by the computing system.

In one embodiment, a computing device performs a method comprising: receiving, by the computing device, a new edit; updating an edit file (e.g., edit document 804) to include the new edit, the edit file comprising a plurality of anchor points, each anchor point pointing to one of a plurality of aggregate objects including a first aggregate object (e.g., aggregate contact 802); determining, by the computing device, based on the plurality of anchor points, that the edit file corresponds to the first aggregate object; and applying the edit file to update the first aggregate object based on the new edit (e.g., changing the email address data for Endpoint 1).

The edit file may include a plurality of prior edits applied to the first aggregate object prior to receiving the new edit. A score may be determined for each of a plurality of endpoints of the first aggregate object including a first score for a first endpoint, wherein each anchor point of the plurality of anchor points comprises a weight (e.g., Weight 1), wherein the plurality of anchor points comprises a first anchor point (e.g., AP1) that points to the first endpoint (e.g., Endpoint 1), and wherein the weight of the first anchor point is based on the first score.

For example, Endpoint 1 may have a score of 3.5. The weight of an anchor point that links to Endpoint 1 may be, for example, 3.5 or some linear or other mathematical variation of the score (e.g., [2×weight]+4). Numerous other varieties of scoring may be used in various embodiments (e.g., scores may also be partially based on a contact rank). In one example, the first aggregate object is associated with a first person (e.g., Walter), and the score of a second endpoint (e.g., Work Phone Number) of the endpoints is based on social data of the first person. For example, the usage of the Work Phone Number by friends in the social network may be used as input for calculating a score.

In one embodiment, each anchor point comprises a weight, and the determining of an aggregate contact to edit based on the plurality of anchor points comprises comparing an anchor point in the edit file that points to the first aggregate object with at least one other anchor point in the edit file that points to a different aggregate object (e.g., edit document 804 may contain anchor points that point to an aggregate contact other than contact 802), as discussed in more detail below. For example, the weights of the anchor points that point to contact 802 may be compared to the weights of other anchor points that point to a different contact.

In one embodiment, each anchor point comprises a weight, and the determining that the edit file corresponds to the first aggregate object is based on the weights of the anchor points at the time of receiving the new edit. For example, as discussed above, the weights of the anchor points may dynamically change during operation of a computing system. In order to implement the intent of the user at the time of her entering an edit, the weights of the anchor points at the time of this edit are stored in the edit document 804 and used in identifying the aggregate contact that corresponds to the edit document. As was discussed above, identifying the contact is done in order to determine which contact will receive the edits requested by the user.

Figure 9:
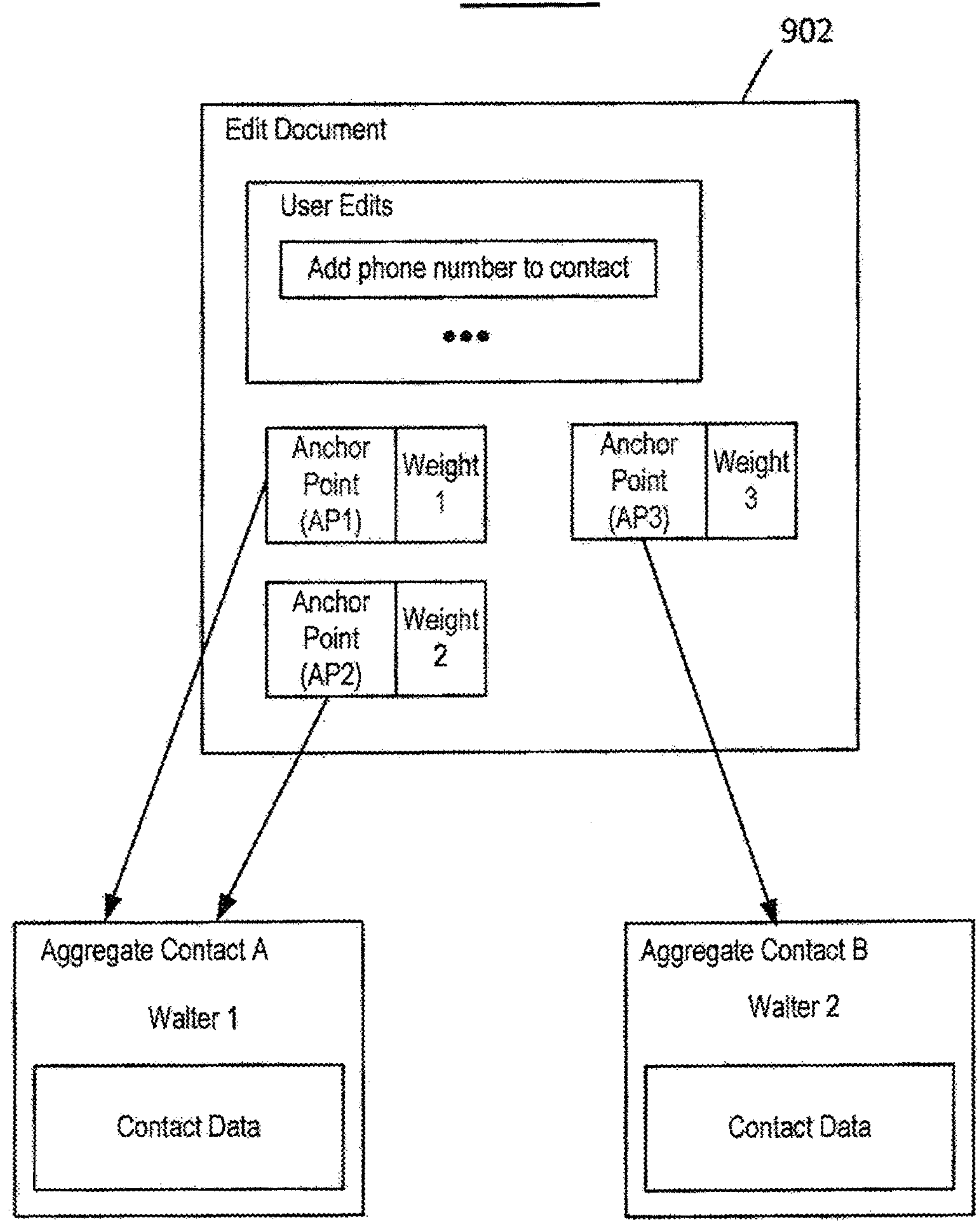
FIG. 9 illustrates an edit document containing anchor points that point to different aggregate contacts in accordance with one or more embodiments of the present disclosure.

FIG. 9 illustrates an edit document 902 containing anchor points that point to different aggregate contacts in accordance with one or more embodiments of the present disclosure. As was mentioned above, edit document 902 contains anchor points AP1 and AP2 that each point to aggregate contact A, and anchor point AP3 that points to aggregate contact B. During Step 410, edit document 902 is resolved to determine a corresponding aggregate contact into which a new user edit to add a phone number will be made. In other words, Step 410 must select either Contact A or Contact B for applying the new user edit.

As was mentioned above, the weights of each anchor point can be compared in order to determine the aggregate contact for applying edits. For example, the contact for which the anchor points have the highest sum of weights can be selected. In another example, the contact for which an anchor point has the highest individual weight can be selected. In another example, the contact which has the highest number of anchor points pointing to it, without regard to any weight, can be selected.

Figure 10:
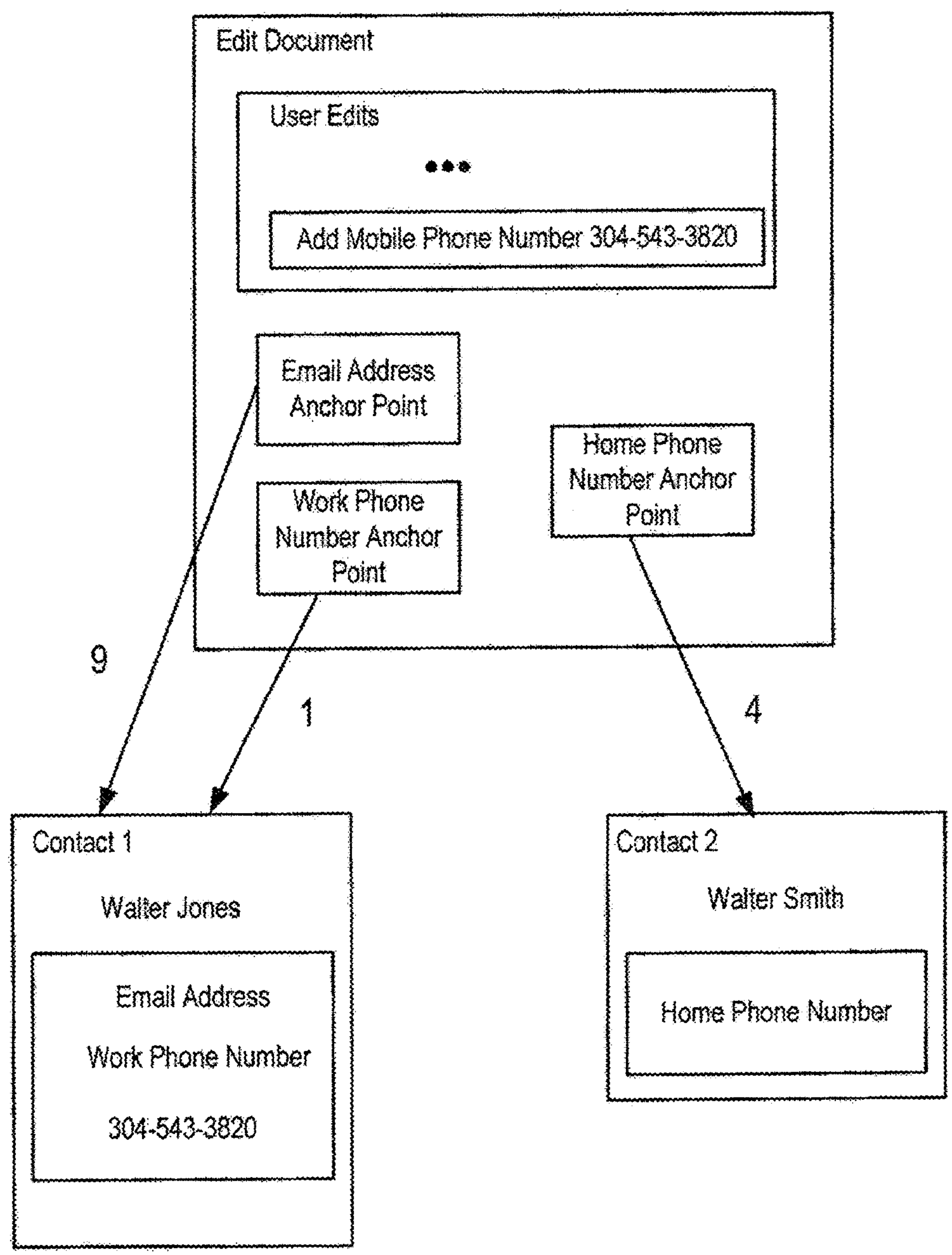
FIG. 10 illustrates an example of applying an edit document to update a phone number of a contact per a user request in accordance with one or more embodiments of the present disclosure.

FIG. 10 illustrates an example of applying an edit document to update a phone number of a contact per a user request in accordance with one or more embodiments of the present disclosure. The weights of the anchor points are illustrated in FIG. 10 by numerals next to an illustrated arrow from an anchor point. For example, Contact 1 has two anchor points with the total sum of weights of 10 (i.e., 9+1). Contact 2 has a single anchor point with a weight of 4. Contact 1 is selected by resolution logic that determines this contact will be used for applying the edit document.

In an alternative approach, Contact 1 may be selected by resolution logic that determines that the first aggregate contact (Contact 1) is pointed to by a highest number of the anchor points (without using any weights in the determination). In one example, the new user edit is a request to change an email address endpoint of Contact 1 to a new email address, and editing logic updates the first aggregate contact to include the new email address.

In one embodiment, ranking logic determines a score for each of a plurality of endpoints used by the aggregate contacts (including Contact 1 and Contact 2). Each anchor point points to one of these endpoints, and each anchor point comprises a weight based on the score of the endpoint pointed to by the anchor point.

Various additional non-limiting embodiments and examples are now discussed below. These embodiments and examples are not intended to limit the generality of the foregoing disclosure.

In one embodiment, aggregate contacts may be used in a digital address book. In other embodiments, the above disclosure may be applied to any data set that can be aggregated.

In one embodiment, each piece of input data is represented by an anchor point. Each anchor point has a weight. A higher weight indicates that the anchor point is more relevant than an anchor point with a lower weight.

In one embodiment, when input data is aggregated into aggregate contacts, such as by using an aggregation algorithm, each of the anchor points that map to a piece of input data are pulled into the aggregate data.

In one embodiment, when a user makes an edit to an aggregate object, the list of edits that are submitted by the user are used to create an edit document containing those edits. The edit document is tied back to the anchor points that represent the aggregate data at the time that the user made the edit. In this case, those anchor points all have a weight. In some cases, the aggregate data is modified directly and the user provided with real-time feedback.

When the aggregation algorithm runs again, after creation of the edit document, the aggregate contacts are again generated as though the edits in the edit document did not exist. Then, the list of edit documents is traversed and each edit document is resolved to an aggregate contact to which the edits of that edit document will be applied. This resolution is done by edit resolution module 312 in Step 410, as was discussed above. The edits for an edit document are applied to the identified aggregate contact and then the final contact is persisted.

In one embodiment, the edit document resolution strategy identifies the aggregate data object having a highest weighted anchor point from the edit document. In one example, the sum of the weights for the anchor points pointing to a given contact is calculated. If the sum of these weights is greater than or equal to a predetermined percentage (e.g., 50%) of the sum of all anchor point weights in the edit document, then this contact is selected. If the sum of the weights for the anchor points pointing to that contact are less than the predetermined percentage, then the edit document is discarded as being unresolvable.

In one embodiment, when a user edits the contact, and edit document is created, as was mentioned above. The edit document represents all the edits that have been made for that contact since it was originally created. If the user makes future edits to the same contact, the existing edit document is updated. The edit document is anchored to all endpoints for the contact. The weight or strength of each anchor point is proportional to a normalized score of the given endpoint. The anchor point weights are only updated when the edit document is modified, at which time the contact to which the edit document currently belongs is used to fully recalculate all the anchor point weights.

In one embodiment, an existing contact may be split into two contacts. This may occur when a computing system determines that, for example, an e-mail address or other information in an existing contact does not belong in that contact and should be moved to a new contact, such as for a different person. The edit document for the existing contact must be assigned to only one of the two new contacts. The edit resolution strategy described above may be used to determine the one of these contacts to which the edit document should be assigned.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:

creating, by a computing device, a plurality of aggregate contacts using contact data collected by a network;

storing the aggregate contacts in a data repository;

receiving a new user edit related to one of the aggregate contacts;

automatically updating an electronic edit document to include the new user edit, the electronic edit document comprising a plurality of anchor points, each anchor point pointing to one of the plurality of aggregate contacts, and each anchor point comprising a weight;

determining a rank for each of the plurality of aggregate contacts, wherein the rank indicates a strength of a relationship to the respective aggregate contact;

determining, by the computing device, based on the weights of the plurality of anchor points at the time of receiving the new user edit, that the electronic edit document corresponds to a first aggregate contact, wherein the plurality of anchor points comprises a first anchor point that points to the first aggregate contact, the first aggregate contact has a first rank, and the weight of the first anchor point is based on the first rank, wherein the first aggregate contact is associated with a first person, and the first rank is based on usage of contact data of the first aggregate contact by friends in a social network of the first person, and wherein the determining based on the weights of the plurality of anchor points further comprises comparing a sum of weights for anchor points in the electronic edit document that point to the first aggregate contact to a sum of weights for all anchor points in the electronic edit document;

applying the electronic edit document to update the first aggregate contact, the applying comprising updating contact data of the first aggregate contact using the new user edit; and storing the updated first aggregate contact in the data repository.

2. The method of claim 1, wherein the electronic edit document further comprises a plurality of prior user edits applied to the first aggregate contact prior to receiving the new user edit.

3. The method of claim 1, wherein the first rank is further based on prior messages sent to the first person by a user.

4. The method of claim 1, further comprising updating the weights for at least one of the anchor points after applying the electronic edit document.

5. A non-transitory computer-readable storage medium tangibly encoded with computer-executable instructions, that when executed by a processor associated with a computing device, performs a method comprising:

receiving, by the computing device, a new edit related to one of a plurality of aggregate objects;

automatically updating an electronic edit file to include the new edit, the electronic edit file comprising a plurality of anchor points, each anchor point pointing to one of the plurality of aggregate objects, and each anchor point comprising a weight;

determining a rank for each of the plurality of aggregate objects, wherein the rank indicates a strength of a relationship to the respective aggregate object;

determining, by the computing device, based on the weights of the plurality of anchor points at the time of receiving the new edit, that the electronic edit file corresponds to a first aggregate object, wherein the plurality of anchor points comprises a first anchor point that points to the first aggregate object, the first aggregate object has a first rank, and the weight of the first anchor point is based on the first rank, wherein the first aggregate object is associated with a first person, and the first rank is based on usage of contact data of the first aggregate object by friends in a social network of the first person, and wherein the determining based on the weights of the plurality of anchor points further comprises comparing the first anchor point with at least one other anchor point in the electronic edit file that points to a different aggregate object; and applying the electronic edit file to update the first aggregate object based on the new edit.

6. The non-transitory computer-readable storage medium of claim 5, wherein the electronic edit file further comprises a plurality of prior edits applied to the first aggregate object prior to receiving the new edit.

7. The non-transitory computer-readable storage medium of claim 6, wherein the method further comprises determining a score for each of a plurality of endpoints of the first aggregate object including a first score for a first endpoint, wherein the first anchor point points to the first endpoint, and wherein the weight of the first anchor point is further based on the first score.

8. The non-transitory computer-readable storage medium of claim 7, wherein the score of a second endpoint of the endpoints is based on social data of the first person.

9. A system comprising:

a data repository to store a plurality of aggregate contacts;

a processor;

a non-transitory computer-readable storage medium for tangibly storing thereon program logic for execution by the processor, the program logic comprising:

creation logic executed by the processor for creating the plurality of aggregate contacts;

communication logic executed by the processor for receiving, over a network, a new user edit related to one of the plurality of aggregate contacts;

updating logic executed by the processor for automatically updating an electronic edit document to include the new user edit, the electronic edit document comprising a plurality of anchor points, each anchor point pointing to one of the plurality of aggregate contacts, and each anchor point comprising a weight;

ranking logic executed by the processor for determining a rank for each of the plurality of aggregate contacts, wherein the rank indicates a strength of a relationship to the respective aggregate contact;

resolution logic executed by the processor for determining, based on the weights of the plurality of anchor points at the time of receiving the new user edit, that the electronic edit document corresponds to a first aggregate contact, wherein the plurality of anchor points comprises a first anchor point that points to the first aggregate contact, the first aggregate contact has a first rank, and the weight of the first anchor point is based on the first rank, wherein the first aggregate contact is associated with a first person, and the first rank is based on usage of contact data of the first aggregate contact by friends in a social network of the first person, and wherein the determining based on the weights of the plurality of anchor points further comprises comparing the first anchor point with at least one other anchor point in the electronic edit document that points to a different aggregate contact; and editing logic executed by the processor for applying the electronic edit document to the first aggregate contact.

10. The system of claim 9, wherein the resolution logic further determines that the first aggregate contact is pointed to by a highest number of the anchor points.

11. The system of claim 9, wherein the resolution logic further determines that the first aggregate contact is pointed to by the one of the anchor points having a highest weight.

12. The system of claim 9, wherein the first anchor point points to an email address of the first aggregate contact.

13. The system of claim 12, wherein the new user edit is a request to change the email address to a new email address, and the editing logic updates the first aggregate contact to include the new email address.

14. The system of claim 9, wherein the program logic further comprises ranking logic executed by the processor for determining a score for each of a plurality of endpoints used by the plurality of aggregate contacts, each anchor point points to one of the endpoints, and each anchor point comprises a weight based on the score of the endpoint pointed to by the anchor point.

* * * * *